United States Patent
Kokubu

(10) Patent No.: US 10,306,162 B2
(45) Date of Patent: May 28, 2019

(54) IMAGE PICKUP APPARATUS

(71) Applicant: OLYMPUS CORPORATION, Tokyo (JP)

(72) Inventor: Kento Kokubu, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/630,997

(22) Filed: Jun. 23, 2017

(65) Prior Publication Data

US 2017/0289476 A1    Oct. 5, 2017

Related U.S. Application Data

(63) Continuation of application No. PCT/JP2015/059411, filed on Mar. 26, 2015.

(30) Foreign Application Priority Data

Dec. 25, 2014  (JP) ................. 2014-262688

(51) Int. Cl.
*H04N 5/232* (2006.01)
*H04N 5/343* (2011.01)
*H04N 5/353* (2011.01)
*H04N 5/355* (2011.01)
*H04N 5/374* (2011.01)
*G03B 5/00* (2006.01)
(Continued)

(52) U.S. Cl.
CPC ........... *H04N 5/35536* (2013.01); *G03B 5/00* (2013.01); *G03B 9/08* (2013.01); *H04N 5/232* (2013.01);
(Continued)

(58) Field of Classification Search
CPC .............. G03B 5/00; G03B 2205/0038; G03B 2217/005; H04N 5/232; H04N 5/23258;
(Continued)

(56) References Cited

U.S. PATENT DOCUMENTS

| 2007/0189745 A1 | 8/2007 | Masuda |
| 2008/0181594 A1* | 7/2008 | Noguchi ............... G03B 17/02 396/55 |

(Continued)

FOREIGN PATENT DOCUMENTS

| JP | H11-337809 A | 12/1999 |
| JP | 2004-080459 A | 3/2004 |

(Continued)

OTHER PUBLICATIONS

International Search Report dated Jun. 23, 2015 issued in PCT/JP2015/059411.

(Continued)

*Primary Examiner* — Marly S Camargo
(74) *Attorney, Agent, or Firm* — Scully, Scott, Murphy & Presser, P.C.

(57) ABSTRACT

An image pickup apparatus having: an image sensor, having an image pickup plane, configured to photoelectrically convert a subject image formed on the image pickup plane to an image signal; a driving actuator configured to rotatably move the image sensor relative to a rotation axis passing through the image pickup plane; an angular velocity detection sensor configured to detect a rotational angular velocity of the image sensor about the rotation axis; a first shutter configured to control an exposure time of the image sensor; a second shutter configured to control the exposure time of the image sensor; and one or more processors configured to: control the driving actuator to reduce rotational shake around the rotation axis based on the rotational angular velocity; and select one of the first shutter and the second shutter to control the exposure time of the image sensor based on the rotational angular velocity.

22 Claims, 6 Drawing Sheets

(51) Int. Cl.
  *G08B 13/196* (2006.01)
  *G03B 9/08* (2006.01)
  *H04N 5/3745* (2011.01)

(52) U.S. Cl.
  CPC ..... *H04N 5/23258* (2013.01); *H04N 5/23261* (2013.01); *H04N 5/23287* (2013.01); *H04N 5/343* (2013.01); *H04N 5/353* (2013.01); *G03B 2205/0038* (2013.01); *G03B 2217/005* (2013.01); *G08B 13/196* (2013.01); *H04N 5/37455* (2013.01)

(58) Field of Classification Search
  CPC .... H04N 5/23261; H04N 5/343; H04N 5/353; H04N 5/35536; H04N 5/37455; G08B 13/196
  USPC .................. 348/221.1, 222.1, 362, 154, 155, 348/169–172, 208.1, 208.99–208.16, 348/219.1, 357, 367, 368; 396/133–136, 396/13, 52–55, 452–510; 382/107; 359/554–557; 250/232, 233; 352/204–220
  See application file for complete search history.

(56) References Cited

U.S. PATENT DOCUMENTS

| | | | | |
|---|---|---|---|---|
| 2008/0211922 | A1* | 9/2008 | Murashima | G03B 5/02 348/208.99 |
| 2008/0298790 | A1 | 12/2008 | Uenaka et al. | |
| 2009/0231450 | A1 | 9/2009 | Tanaka et al. | |
| 2010/0110202 | A1* | 5/2010 | Matsutani | H04N 5/228 348/208.5 |
| 2010/0165126 | A1 | 7/2010 | Uenaka | |
| 2015/0181125 | A1* | 6/2015 | Noguchi | H04N 5/23287 348/208.11 |
| 2016/0127649 | A1* | 5/2016 | Touchiya | H04N 5/23284 348/208.4 |
| 2017/0134649 | A1* | 5/2017 | Wakamatsu | H04N 5/23229 382/103 |
| 2018/0103205 | A1* | 4/2018 | Kikuchi | H04N 5/2251 348/208.2 |

FOREIGN PATENT DOCUMENTS

| | | |
|---|---|---|
| JP | 2006-349744 A | 12/2006 |
| JP | 2007-053742 A | 3/2007 |
| JP | 2007-193155 A | 8/2007 |
| JP | 2007-212933 A | 8/2007 |
| JP | 2008-257209 A | 10/2008 |
| JP | 2010-152122 A | 7/2010 |
| JP | 2011-091664 A | 5/2011 |
| JP | 2011-160126 A | 8/2011 |

OTHER PUBLICATIONS

English translation of International Preliminary Report on Patentability dated Jul. 6, 2017 together with the Written Opinion received in related International Application No. PCT/JP2015/059411.

* cited by examiner

IMAGE PICKUP APPARATUS

CROSS-REFERENCE TO RELATED APPLICATION

The present application is based upon and claims the benefit of priority from the prior Japanese Patent Application No. 2014-262688 filed on Dec. 25, 2014. The entire content of Japanese Patent Application No. 2014-262688 is incorporated herein by reference.

BACKGROUND OF THE INVENTION

Field of the Invention

The present invention relates to an image pickup apparatus which performs an imaging operation by using a mechanical shutter and an electronic shutter together.

Description of the Related Art

As disclosed in Patent Document 1 and Patent Document 2, there has been known an image pickup apparatus which performs an imaging operation by using a mechanical shutter and an electronic shutter together.

Meanwhile, as disclosed in Patent Document 2, there has been increasing the number of image pickup apparatuses incorporating a camera shake correction function for suppressing the deterioration in image quality of a picked-up image due to camera shake.

Furthermore, as disclosed in Patent Document 3, there has also been proposed a technique of estimating a shake amount in imaging and performing correction driving according to the estimated shake amount to increase the correction accuracy of a camera shake correction function.

[Patent Document 1] Japanese Patent Application Laid-Open No. 2007-53742

[Patent Document 2] Japanese Patent Application Laid-Open No. 2007-193155

[Patent Document 3] Japanese Patent Application Laid-Open No. 2004-80459

Here, when a user uses an image pickup apparatus, a camera shake may occur in some cases in a rotation direction around the optical axis of an optical system constituting the image pickup apparatus. In the case of an occurrence of this kind of rotational camera shake, the camera shake correction function rotationally drives an image sensor at a high speed to reduce the rotational camera shake.

On the other hand, a mechanical shutter such as a focal plane shutter is fixedly disposed in the image pickup apparatus with the horizontal and vertical directions set so as to agree with the horizontal and vertical directions of an image sensor in a steady state in which the image sensor is not rotating. Therefore, when the image sensor rotates to reduce the rotational camera shake, the horizontal direction of the mechanical shutter deviates from the horizontal direction of the image sensor.

Therefore, if a large rotational camera shake has occurred during exposure, a mechanical shutter operation causes a difference in exposure time between pixels on the same pixel row of the image sensor, though the exposure time should be normally the same in the same pixel row, thereby causing unevenness in exposure amount.

SUMMARY OF THE INVENTION

Therefore, it is an object of the present invention to provide an image pickup apparatus capable of preventing unevenness in exposure amount even if a large rotational camera shake has occurred during exposure.

According to one aspect of the present invention, there is provided an image pickup apparatus, including: an image pickup apparatus including: an image sensor provided with an image pickup plane for photoelectrically converting a subject image; a driving part which rotatably moves the image sensor relative to a predetermined rotation axis passing through the center of the image pickup plane; an angular velocity detection part which detects a rotational angular velocity of the image pickup apparatus about the predetermined rotation axis; a rotational shake reduction control part which controls the driving part to reduce rotational shake which occurs along with an attitude change around the predetermined rotation axis of the image pickup apparatus based on the rotational angular velocity; a first shutter part of a mechanical type which controls the exposure time of the image sensor; a second shutter part of an electronic type which controls the exposure time of the image sensor; and a shutter selection part which selects either one of the first shutter part and the second shutter part according to the rotational angular velocity.

According to another aspect of the present invention, there is provided an image pickup apparatus including: an image sensor provided with an image pickup plane for photoelectrically converting a subject image; a driving part which rotatably moves the image sensor relative to a predetermined rotation axis passing through the center of the image pickup plane; an angular velocity detection part which detects a rotational angular velocity of the image pickup apparatus about the predetermined rotation axis; an angular velocity estimation part which estimate a rotational angular velocity of the image pickup apparatus in exposure to obtain an estimated rotational angular velocity; a rotational shake reduction control part which controls the driving part to reduce rotational shake which occurs along with an attitude change around the predetermined rotation axis of the image pickup apparatus based on the estimated rotational angular velocity; a first shutter part of a mechanical type which controls the exposure time of the image sensor; a second shutter part of an electronic type which controls the exposure time of the image sensor; and a shutter selection part which selects either one of the first shutter part and the second shutter part according to the estimated rotational angular velocity.

According to the above described aspects of the present invention, a shutter to be used is able to be switched according to the detected rotational angular velocity or according to the estimated rotational angular velocity, thereby enabling the provision of an image pickup apparatus capable of preventing unevenness in exposure amount even if a large rotational camera shake has occurred during exposure.

DETAILED DESCRIPTION

First Embodiment

Figure 1:
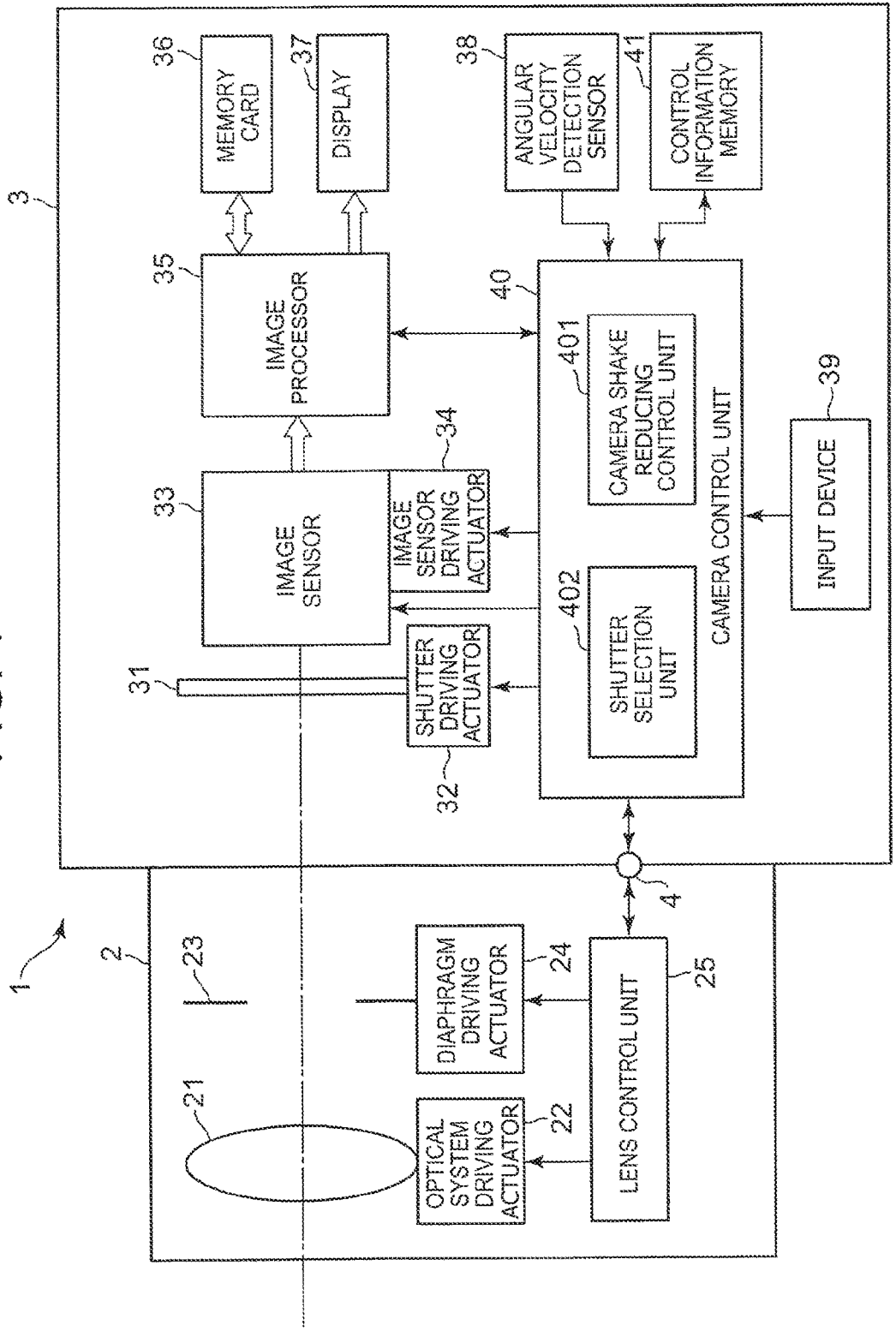
FIG. 1 is a block diagram illustrating an example of a configuration of an image pickup apparatus according to a first embodiment of the present invention.

As illustrated in FIG. 1, an image pickup apparatus 1 according to a first embodiment has a configuration in which an interchangeable lens 2 can be mounted on a camera body 3. The camera body 3 is configured so that the interchangeable lens 2 is mountable to and demountable from the camera body 3. The interchangeable lens 2 can be mounted on the camera body 3 by mutual mating between a lens mount connector, not illustrated, which is provided in the interchangeable lens 2, and a body mount connector, not illustrated, which is provided in the camera body 3. Thereby, the interchangeable lens 2 can be fixed to the camera body 3 and terminals provided in the respective mount connectors can be also mutually electrically connected, thereby enabling communication between the interchangeable lens 2 and the camera body 3 through a contact 4 between the terminals.

Although the image pickup apparatus 1 according to this embodiment is assumed to be a lens interchangeable type camera in which the interchangeable lens 2 and the camera body 3 are provided separately as described above, the present invention is not limited thereto and the image pickup apparatus 1 may be a lens integrated type camera in which the lens is integrally provided on the camera body 3. In the latter case, the image pickup apparatus 1 does not have to be provided with the aforementioned lens mount connector, the body mount connector, and the contact 4.

The interchangeable lens 2 can include an optical system 21, an optical system driving actuator 22, a diaphragm 23, a diaphragm driving actuator 24, and a lens control unit 25. The interchangeable lens 2, however, does not necessarily have to include the diaphragm driving actuator 24 and the lens control unit 25. For example, in the case of manually controlling the optical system 21, the lens control unit 25 is able to be omitted.

The optical system 21 can converge luminous flux incident from a subject to form a subject image (optical image) on the image pickup plane of an image sensor 33 in the camera body. The optical system 21 may include a lens group for focus position adjustment (hereinafter, referred to as "focus lens") not illustrated or a lens group for focal length adjustment (hereinafter, referred to as "zoom lens"). The lens constituting the optical system is not particularly limited.

The optical system driving actuator 22 can move the focus lens or the zoom lens included in the optical system 21 in the optical axis direction under the control of the lens control unit 25. Thereby, focus position adjustment (hereinafter, referred to as "focusing") or focal length adjustment (hereinafter, referred to as "zooming") can be performed.

The diaphragm 23 can include, for example, a diaphragm blade which varies the aperture size of a hole to adjust the amount of luminous flux incident on the image pickup plane passing through the hole.

The diaphragm driving actuator 24 drives the diaphragm blade of the diaphragm 23 under the control of the lens control unit 25.

The lens control unit 25 can be composed of one or more processors comprising hardware, wherein examples of the one or more processors include, but is not limited to, one or more central processing unit (CPU) or an application specific integrated circuit (ASIC). The lens control unit 25 can communicate with a camera control unit 40 in the camera body 3 through the contact 4 and can control the overall operation of the interchangeable lens 2. For example, the lens control unit 25 can control the focusing or zooming by controlling the optical system driving actuator 22 in cooperation with the camera control unit 40.

The camera body 3 can include a mechanical shutter 31, a shutter driving actuator 32, the image sensor 33, an image sensor driving actuator 34, an image processor 35, a memory card 36, a display 37, an angular velocity detection sensor 38, an input device 39, the camera control unit 40, and a control information memory 41. A built-in memory or the like, however, may be used instead of the memory card 36. In addition, a device different from the camera body 3 may include the image processor 35, the memory card 36, the display 37, the angular velocity detection sensor 38, the input device 39, the camera control unit 40, and the control information memory 41.

The mechanical shutter 31, which is a focal plane shutter disposed in front of the image sensor 33, includes a front curtain and a rear curtain. The mechanical shutter 31 controls the exposure time of the image sensor 33 by adjusting the traveling timing of the front curtain and the traveling timing of the rear curtain.

The shutter driving actuator 32 can control the traveling operations of the front curtain and the rear curtain of the mechanical shutter 31 under the control of the camera control unit 40.

The image sensor 33 is configured as an image sensor with exposure controllable by an electronic shutter (for example, electronic rolling shutter) of the image sensor 33. For example, a CMOS sensor, a CCD or any kind of image detecting sensor may be used as the image sensor 33. The electronic rolling shutter in the above means a shutter which performs reset or readout in time series for each pixel or in time series in a line unit when resetting a plurality of pixels two-dimensionally arranged on the image pickup plane of the image sensor 33 or reading out signals. Specifically, the image sensor 33 electronically can control the signal accumulation time for each pixel or for each line, thereby enabling implementation of the same function as the mechanical shutter 31.

Although the electronic rolling shutter has been used as an example of the electronic shutter, the present invention is not limited thereto. For example, a global shutter or the like which exposes all pixels of the image sensor 33 at a time may be used.

The image sensor 33 can convert (photoelectrically convert) the subject image formed on the image pickup plane to an electric signal. The converted electric signal can be read out as an analog image signal under the control of the camera control unit 40 and then the converted electric signal can be converted to a digital image signal (image data) by an A/D conversion circuit, which is not illustrated, to be input to the image processor 35.

The optical axis of the optical system 21 can be adjusted in a stage of design or manufacturing so as to coincide with the image pickup plane center of the image sensor 33.

The image sensor driving actuator 34, which has a configuration of supporting the image sensor 33, rotatably can move the image sensor 33, at least with the image pickup plane center axis of the image sensor 33 as a rotation axis, under the control of the camera control unit 40. The image sensor driving actuator 34 may be configured to move the image sensor 33 in parallel with the X and Y directions. The image sensor driving actuator 34 can include a voice coil motor. The voice coil motor can include a yoke, a magnet and a coil.

Figure 2:
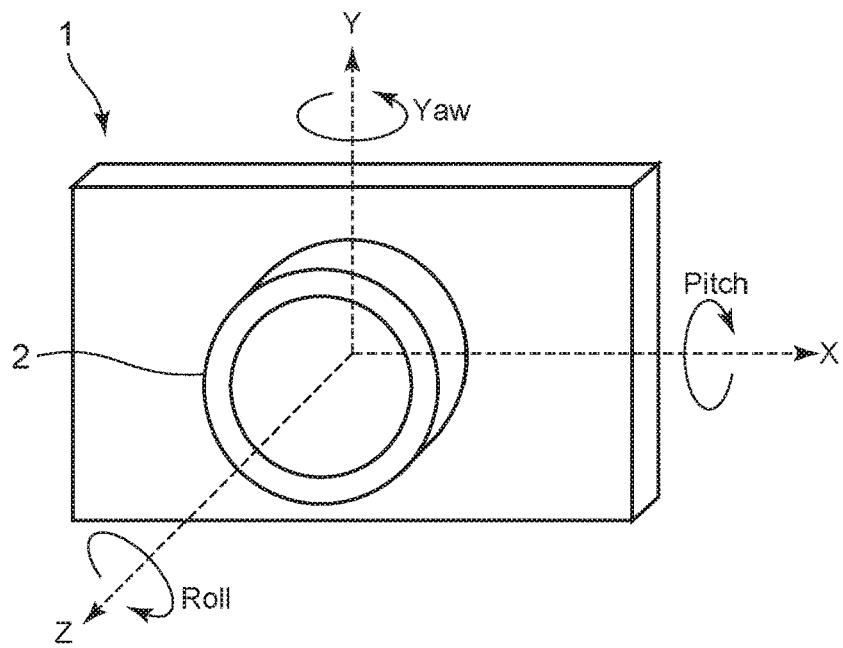
FIG. 2 is diagram for describing the definitions of directions.

Here, the definitions of directions will be described with reference to FIG. 2. In this embodiment, as illustrated in FIG. 2, the X, Y, Z, pitch, yaw, and roll directions of the image pickup apparatus 1 are defined as described below.

The right and left direction (horizontal direction) of the camera body 3 is defined as the X direction. In addition, the right direction is defined as a plus (+) direction and the left direction is defined as a minus (−) direction when viewing the front face of the camera body 3 in the X direction. The X direction also corresponds to the right and left direction of the image pickup plane of the image sensor 33.

The up and down direction (vertical direction) of the camera body 3 is defined as the Y direction. In addition, the up direction is defined as a plus direction and the down direction is a minus direction in the Y direction. The Y direction also corresponds to the up and down direction of the image pickup plane of the image sensor 33.

The optical axis direction of the optical system 21 can include in the interchangeable lens 2 is defined as the Z direction. Additionally, in the Z direction, a direction from the camera body side to the interchangeable lens side is defined as a plus direction and a direction from the interchangeable lens side to the camera body side is defined as a minus direction.

A rotation direction with the X direction as a rotation axis is defined as a pitch direction. Additionally, in the pitch direction, the counterclockwise rotation facing the +X direction is defined as a plus direction and the clockwise rotation facing the +X direction is defined as a minus direction.

The rotation direction with the Y direction as a rotation axis is defined as the Yaw direction. Additionally, in the yaw direction, the clockwise rotation facing the +Y direction is defined as a plus direction and the counterclockwise rotation facing the +Y direction is defined as a minus direction.

The rotation direction with the Z direction as a rotation axis is defined as the roll direction. Additionally, in the roll direction, the counterclockwise rotation facing the +Z direction is defined as a plus direction and the clockwise rotation facing the +Z direction is defined as a minus direction.

The plus and the minus (+, −) in a direction defined as described above depend on the mounting direction of the angular velocity detection sensor 38 and are naturally not limited to the above.

The image processor 35 can perform various kinds of image processing on image data input from the image sensor 33. Moreover, the image processor 35 may be configured to perform also processing of an image read from the memory card 36.

The memory card 36 is a recording medium for recording image data processed for recording by the image processor 35. The memory card 36 is configured to be attachable to and detachable from, for example, the image pickup apparatus 1. In this case, the memory card 36 need not be configured to be peculiar to the image pickup apparatus 1.

The display 37 can display image data processed for displaying by the image processor 35. For example, the display 37 can be a liquid crystal display (LCD) or the like which controls the ON/OFF of the voltages of the pixels of the screen to display an image based on the image data.

The angular velocity detection sensor 38 can detect a rotational angular velocity in a rotation which is an attitude change in the roll direction of the image pickup apparatus 1, in other words, a rotational angular velocity ω of the rotation of the optical system 21 with the optical axis direction of the optical system 21 as a rotation axis.

The input device 39 can receive a user's instruction and transmits the instruction as an operation signal to the camera control part 40. The input device 39 can include a release button not illustrated. The release button may be a two-step button with a half-pressed state which is shallow pressing referred to as "first release (1st R)" and a fully-pressed state which is deep pressing referred to as "second release (2nd R)" and may output an instruction signal depending on the pressed state to the camera control unit 40. The half-pressing of the release button corresponds to an instruction of the AF operation and the full-pressing of the release button corresponds to an instruction of the photographing operation. The AF operation is not directly related to the present invention and any method may be used for the AF operation. Therefore, the description of the configuration and operation for the AF operation is omitted here.

The camera control unit 40, which is composed of a CPU, can communicate with the lens control unit 25 via the contact 4 and can control the overall operation of the camera body 3 and the image pickup apparatus 1. For example, the camera control unit 40 can control focusing and zooming in cooperation with the lens control unit 25. In addition, for example, the camera control unit 40 can control the mechanical shutter 31 and the image sensor 33. Moreover, for example, the camera control unit 40 can receive an instruction signal sent from the input device 39 and performs processing according to the instruction signal (for example, photographing processing according to a photographing instruction signal).

The control information memory 41 can record information such as a control program, control parameters, or the like for operating the camera body 3 in a non-volatile manner.

Furthermore, in this embodiment, the camera control unit 40 can serve as a camera shake reducing control unit 401 and a shutter selection unit 402 according to the control program recorded in the control information memory 41.

The camera shake reducing control unit 401 can control the image sensor driving actuator 34 so as to move the image sensor 33 in a direction of reducing the camera shake at least in the rotation direction on the basis of the output of the angular velocity detection sensor 38 and the rotation center position (which is also the image pickup plane center position) of the image sensor 33.

The shutter selection unit 402 can select either one of the mechanical shutter 31 and the electronic shutter of the image sensor 33 on the basis of the output of the angular velocity detection sensor 38 and the control parameters recorded in the control information memory 41.

In addition, both of the camera shake reducing control unit 401 and the shutter selection unit 402 may be configured as dedicated hardware elements provided separately from the camera control unit 40 or may be one or more processors comprising hardware, such as a CPU or an ASIC, different from that of the camera control unit 40 to serve as the camera shake reducing control unit 401 and the shutter selection unit 402, by using the control program or control parameters recorded in the control information memory 41.

Then, the following describes a technique of selection between the mechanical shutter 31 and the electronic shutter of the image sensor 33 performed by the shutter selection unit 402.

Figure 3:
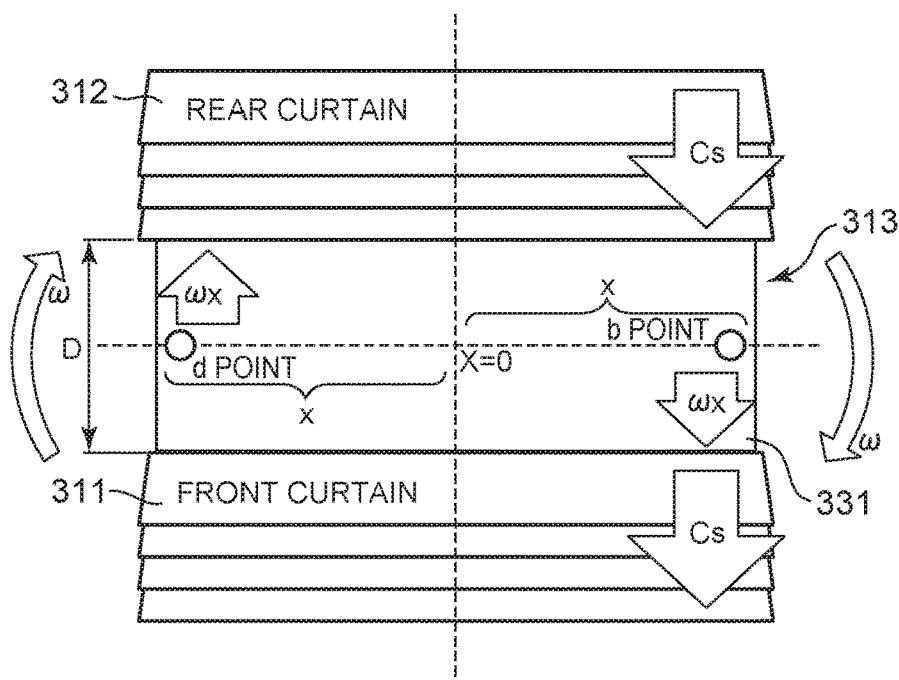
FIG. 3 is a schematic diagram for describing a selection technique between a mechanical shutter and an electronic shutter of an image sensor.

As illustrated in FIG. 3, the mechanical shutter 31 disposed in front of the image pickup plane 331 of the image sensor 33 can include a front curtain 311 and a rear curtain 312. Each of the front curtain 311 and the rear curtain 312 can be composed of, for example, a plurality of shutter blades.

Although not illustrated, the rear curtain 312 can retreat to a position higher than the image sensor 33 and the front curtain 311 light-tightly can cover the space between the image sensor 33 and the optical system 21 of the interchangeable lens 2 before imaging (before exposure) in this kind of mechanical shutter 31.

FIG. 3 illustrates conditions during imaging (during exposure) when the mechanical shutter 31 is driven at a synchronization speed or higher, in other words, when exposure is performed via an exposure slit 313. The upper end of the front curtain 311 can be traveling downward in front of the image sensor 33. On the other hand, the lower end of the rear curtain 312 can be traveling downward to pursue the upper end of the front curtain 311 with a space of a slit interval D of the exposure slit 313. Here, the traveling speed or the curtain speed $C_s$ of the front curtain 311 and the traveling speed or the curtain speed $C_s$ of the rear curtain 312 can be constant independently of the shutter speed. The shutter speed can be determined according to the slit interval D or the traveling start timing of the rear curtain 312.

In addition, although not illustrated, when the imaging (exposure) ends, the front curtain 311 can reach a position lower than the image sensor 33. On the other hand, the rear curtain 312 light-tightly can cover the space between the image sensor 33 and the optical system 21 of the interchangeable lens 2.

Furthermore, although not illustrated, when performing shutter charge, the front curtain 311 and the rear curtain 312 can move upward toward the positions where they were disposed before imaging (before exposure), in cooperation with each other so as to have a portion where the front curtain 311 and the rear curtain 312 overlap with each other (so as to maintain the light tightness).

If camera shake in a rotation direction occurs during imaging (during exposure) with the mechanical shutter 31, the camera shake reducing control unit 401 of the camera control unit 40 can control the image sensor driving actuator 34 to move the image sensor 33 in a direction of reducing the camera shake in the rotation direction on the basis of the rotational angular velocity ω detected by the angular velocity detection sensor 38. Thereby, as illustrated in FIG. 3, the image sensor 33 is rotated at the rotational angular velocity ω in the direction of reducing the camera shake in the rotation direction with the image pickup plane center axis of the image pickup plane 331 of the image sensor 33 as a rotation axis.

In this condition, two pixels at the long-side ends each separated from an origin by a distance x in the X direction with the rotation axis as the origin (X=0) can move at the same speed ωx in vertically opposite directions. The pixel having moved upward can approach the rear curtain 312 of the mechanical shutter 31 traveling at a constant speed and therefore can be shielded by the rear curtain 312 earlier than it should be, by which the pixel is exposed only for a shorter time period than the original exposure time. In contrast, the pixel having moved downward can get away from the rear curtain 312 of the mechanical shutter 31 traveling at a constant speed and therefore can be shielded by the rear curtain 312 later than it should be, by which the pixel is exposed for a longer time period than the original exposure time. Thus, the pixel having moved upward can become a dark point (d point) and the pixel having moved downward can become a bright point (b point).

Pixels positioned concentrically with the two pixels at the long-side ends of the image sensor 33 can become bright or dark points in the same manner, too.

Therefore, in this embodiment, in the case where the light intensity ratio L between the bright point and the dark point is a predetermined threshold value $L_{lim}$ or higher, the shutter selection part 402 of the camera control part 40 can switch the shutter to be used from the mechanical shutter 31 to the electronic shutter of the image sensor 33.

Specifically, when the light intensity ratio L indicated by the following expression (1) satisfies the expression (2) with respect to a predetermined threshold value $L_{lim}$, the shutter can be switched to the electronic shutter:

$$L = L_b/L_d \quad (1)$$

$$L \geq L_{lim} \quad (2)$$

where $L_b$ is the light intensity of the bright point and $L_d$ is the light intensity of the dark point.

The predetermined threshold value $L_{lim}$, however, satisfies the following:

$$L_{lim} > 1 \quad (3)$$

The predetermined threshold value $L_{lim}$ can be a design value arbitrarily determined on a manufacturer side of the image pickup apparatus 1 in the same manner as for hue or the like, and therefore the value cannot be particularly limited here. The predetermined threshold value $L_{lim}$ can be recorded, as one of control parameters, in the control information memory 41.

In practical use, it may not be realistic to measure the light intensities $L_b$ and $L_d$ of the bright point and the dark point, respectively. Therefore, the shutter selection part 402 can select the shutter to be used as described below.

In this respect, when it is defined that $C_s$ is the curtain speed of the front curtain 311 and the rear curtain 312 of the mechanical shutter 31, D is a slit interval (less than the short side length), ω is a rotational angular velocity (without regard to the rotation direction), x is a distance from the center of the image pickup plane 331 of the image sensor 33 to the long-side end of the image pickup plane 331, and $T_i$ is exposure time (i=b: bright point, d: dark point) and the following is satisfied:

$$C_s > \omega x$$

the exposure time $T_b$ of the bright point and the exposure time $T_d$ of the dark point satisfy the following:

$$T_b = D/(C_s - \omega x) \quad (4)$$

$$T_d = D/(C_s + \omega x) \quad (5)$$

Furthermore, the light intensity $L_b$, $L_d$ is proportional to the exposure time $T_b$, $T_d$ and therefore the following expression is obtained from the expression (1):

$$L = T_b/T_d \quad (6)$$

Therefore, when the expressions (4) and (5) are substituted in the expression (6), the following equation is obtained:

$$L = \{D/(C_s - \omega x)\}/\{D/(C_s + \omega x)\} = (C_s + \omega x)/(C_s - \omega x) \quad (7)$$

Accordingly, the following is obtained from the expression (2) according to the expression (7):

$$(C_s+\omega x)/(C_s-\omega x) \geq L_{lim} \quad (8)$$

Furthermore, if consideration is made for a case of $C_s<\omega x$, the following may be used as a condition for switching to the electronic shutter:

$$(C_s+\omega x)/(C_s-\omega x) \geq L_{lim} \quad (9)$$

In this respect, the curtain speed $C_s$, the distance x from the center of the image pickup plane 331 to the long-side end, and the predetermined threshold value $L_{lim}$ are design values and are fixed values recorded as control parameters in the control information memory 41. Therefore, the shutter selection part 402 can calculate the left side of the expression (9) on the basis of the rotational angular velocity co able to be detected by the angular velocity detection sensor 38 and can switch to the electronic shutter if the expression (9) is satisfied.

If $C_s \gg \omega x$ or $C_s \ll \omega x$ is satisfied, the light intensity ratio L is substantially 1 and therefore the condition of the expression (9) cannot be satisfied. If $C_s \gg \omega x$ is satisfied, it means that the shake is negligibly small. If $C_s \ll \omega x$ is satisfied, it means that the slit interval D exceeds the short side length and that exposure is performed with the image pickup plane fully opened.

Figure 4:
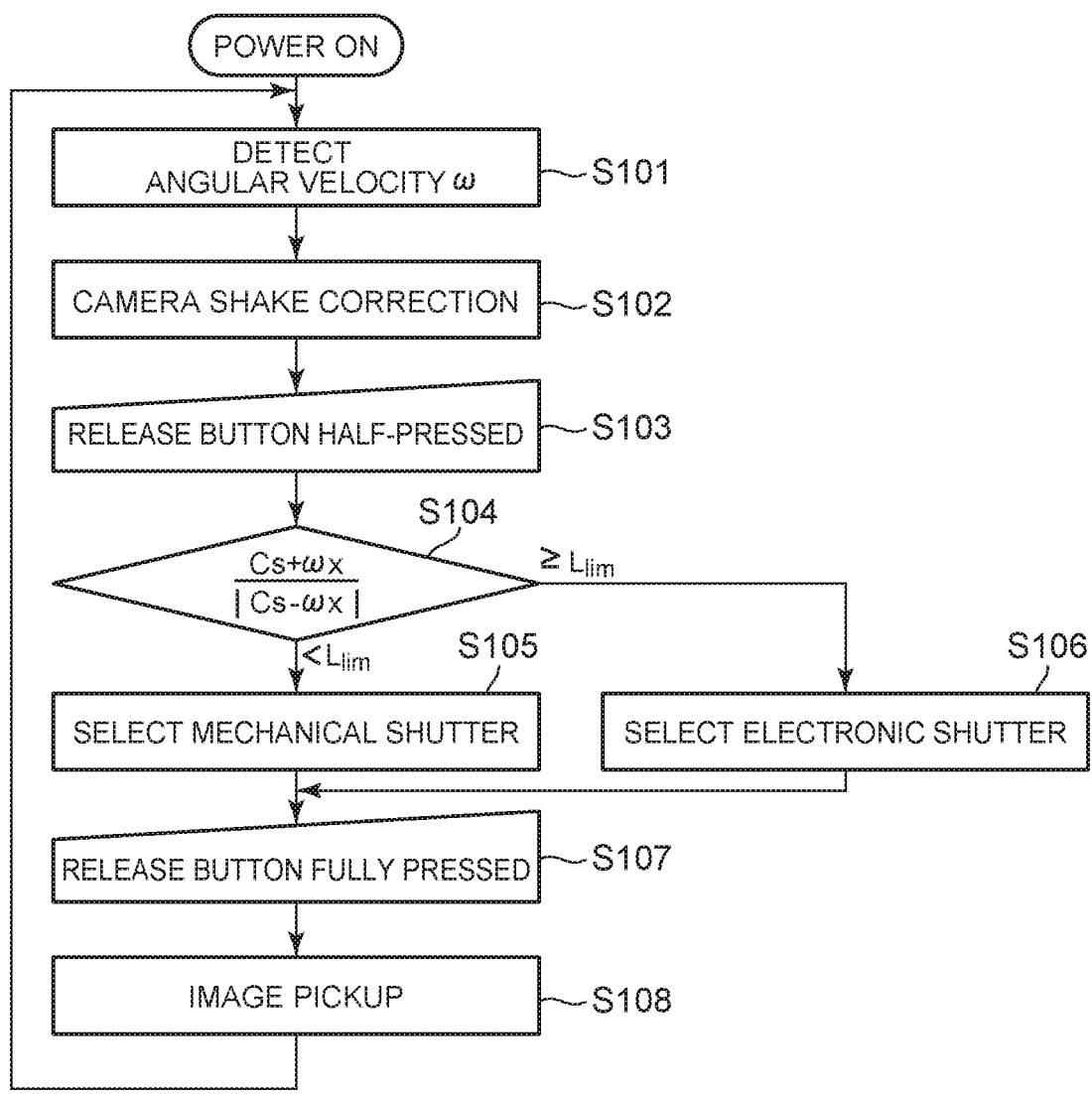
FIG. 4 is a diagram illustrating a flowchart for describing an operation of the image pickup apparatus according to the first embodiment.

Subsequently, the operation of the image pickup apparatus 1 of this embodiment will be described with reference to FIG. 4.

When the power supply of the image pickup apparatus 1 is turned on, the camera control unit 40 performs a function of a camera shake reducing control unit 401 according to a control program recorded in the control information memory 41. Specifically, the camera shake reducing control unit 401 of the camera control unit 40 can fetch the rotational angular velocity in the roll direction of the image pickup apparatus 1 detected by the angular velocity detection sensor 38, in other words, the rotational angular velocity ω of the optical system 21 with the image pickup plane center axis of the image sensor 33 as the rotation axis (step S101) and can control the image sensor driving actuator 34 so as to move the image sensor 33 in a direction of reducing the camera shake in the rotation direction on the basis of the rotational angular velocity ω (step S102). The function of the camera shake reducing control unit 401 can continue to be performed until the power supply is turned off. In addition, naturally the camera shake reduction may be performed not only in the rotation direction, but also in the right and left direction, the up and down direction, the yaw direction, and the pitch direction of the image pickup plane 331 of the image sensor 33.

When the release button of the input device 39 is half-pressed (step S103), the camera control unit 40 can perform the function of the shutter selection unit 402 according to the control program recorded in the control information memory 41. Specifically, the shutter selection unit 402 of the camera control unit 40 can calculate the left side of the expression (9) by using the rotational angular velocity ω and can discriminate whether the expression (9) is satisfied (step S104). Unless the expression (9) is satisfied, the mechanical shutter 31 is selected as a shutter to be used (step S105). Whereas, if the expression (9) is satisfied, the electronic shutter of the image sensor 33 is selected as a shutter to be used (step S106).

Then, when the release button of the input device 39 is fully pressed (step S107), the camera control unit 40 can perform an imaging operation by using the selected shutter (step S108). Specifically, if the mechanical shutter 31 is selected, the camera control unit 40 can control the shutter driving actuator 32 to perform the imaging operation by using the mechanical shutter 31. Moreover, if the electronic shutter is selected, the camera control unit 40 can control the image sensor 33 to perform the imaging operation by using the electronic shutter.

Thereafter, the processing returns to step S101.

As described hereinabove, the image pickup apparatus 1 according to the first embodiment can include the image sensor 33 provided with the image pickup plane 331 for photoelectrically converting a subject image, the image sensor driving actuator 34 configured to rotatably move the image sensor 33 relative to a predetermined rotation axis passing through the center of the image pickup plane 331, the angular velocity detection sensor 38 configured to detect the rotational angular velocity of the image pickup apparatus 1 about the predetermined rotation axis, the camera shake reducing control unit 401 configured to control the image sensor driving actuator 34 to reduce rotational shake which occurs along with an attitude change around the predetermined rotation axis of the image pickup apparatus 1 on the basis of the rotational angular velocity, the mechanical shutter 31 which is a first shutter of a mechanical type configured to control the exposure time of the image sensor 33, the electronic shutter of the image sensor 33 which is a second shutter of an electronic type configured to control the exposure time of the image sensor 33, and the shutter selection unit 402 configured to select either one of the mechanical shutter 31 and the electronic shutter of the image sensor 33 according to the rotational angular velocity. Specifically, the shutter to be used is able to be switched according to the rotational angular velocity, thereby enabling the provision of an image pickup apparatus capable of preventing unevenness in exposure amount even if a large rotational camera shake has occurred during exposure. Specifically, if it is supposed that unevenness in exposure amount is caused by using the mechanical shutter 31, the unevenness in exposure amount caused by traveling of the front curtain and the rear curtain is prevented by selecting the electronic shutter with the mechanical shutter 31 fully opened.

The predetermined rotation axis can be an image pickup plane center axis of the image sensor and can coincide with the optical axis of the optical system 21. Therefore, the same advantageous effect can be obtained by using either the lens interchangeable type image pickup apparatus or the lens integrated type image pickup apparatus.

Furthermore, the shutter selection unit 402 may be configured to select the electronic shutter if the rotational angular velocity ω satisfies the following conditional expression:

$$(C_s+\omega x)/(|C_s-\omega x|) \geq L_{lim}$$

where $C_s$ is the curtain speed of the mechanical shutter 31, ω is the rotational angular velocity, x is a distance from the center of the image pickup plane 331 to the long-side end of the image pickup plane 331, and $L_{lim}$ is a predetermined threshold value. Specifically, if the rotational angular velocity ω is within a speed range in which unevenness in exposure amount is likely to occur, the occurrence of unevenness in exposure amount is able to be prevented by switching from the mechanical shutter 31 to the electronic shutter.

Although particularly not illustrated, the image pickup apparatus 1 further can include a gravity direction detection sensor configured to detect a gravity direction and the image sensor driving actuator 34 may rotatably move the image sensor 33 so that one side of the image sensor 33 can be parallel to the gravity direction.

Moreover, although the present invention has been described by giving an example that the operation is performed with the camera shake reduction triggered by power supply and with the shutter selection triggered by half-pressing of the release button, the present invention is not limited thereto. For example, the camera shake reduction also may be triggered by half-pressing of the release button. Furthermore, the present invention does not presuppose the two-step release button.

Second Embodiment

A second embodiment will be described below. As disclosed in Patent Document 3, an image pickup apparatus 1 according to this embodiment can be configured to increase the accuracy in a camera shake reduction function by estimating the shake amount in imaging and performing reduction driving according to the estimated shake amount. It is assumed that a configuration example of the second embodiment and an operation according to the second embodiment are partially the same as those of the first embodiment. The same reference numerals are used for the same elements as in the first embodiment and the description thereof is omitted here.

Figure 5:
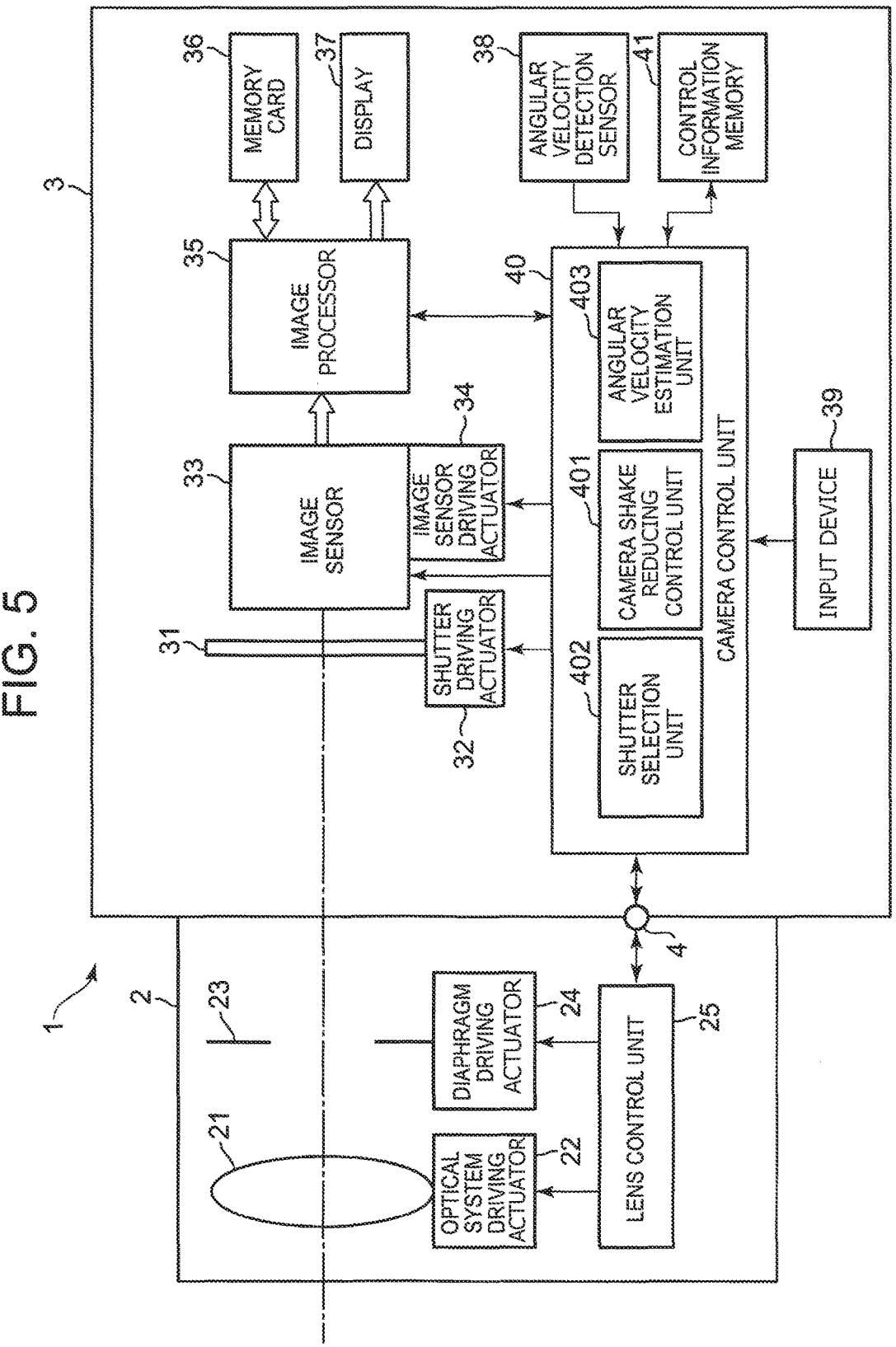
FIG. 5 is a block diagram illustrating an example of a configuration of an image pickup apparatus according to a second embodiment of the present invention.

Specifically, in the image pickup apparatus 1 according to the second embodiment, as illustrated in FIG. 5, the camera control unit 40 includes an angular velocity estimation unit 403 which can estimate a rotational angular velocity ω' in exposure, in addition to the configuration of the image pickup apparatus 1 according to the first embodiment. Moreover, the camera shake reduction control unit 401 of the camera control unit 40 controls camera shake reduction on the basis of the estimated rotational angular velocity ω'.

In the image pickup apparatus 1 capable of reducing the effects of camera shake by using the estimated rotational angular velocity ω' as described above, the shutter selection unit 402 of the camera control unit 40 uses the rotational angular velocity ω' in exposure estimated by the angular velocity estimation unit 403, instead of the rotational angular velocity in the roll direction of the image pickup apparatus 1 detected by the angular velocity detection sensor 38 in the first embodiment, in other words, the rotational angular velocity ω of the optical system 21 with the optical axis direction of the optical system 21 as a rotation axis. Specifically, instead of the expression (9) in the first embodiment, the following expression (10) is used:

$$(C_s+\omega'x)/(|C_s-\omega'x|) \geq L_{lim} \quad (10)$$

In addition, all of the camera shake reduction control unit 401, the shutter selection unit 402, and the angular velocity estimation unit 403 may be configured as dedicated hardware elements provided separately from the camera control unit 40 or may be composed of one or more processors comprising hardware, such as a CPU or an ASIC different from that of the camera control unit 40, to serve as the camera shake reducing control unit 401, the shutter selection unit 402, and the angular velocity estimation unit 403, by using the control program or control parameters recorded in the control information memory 41.

Figure 6:
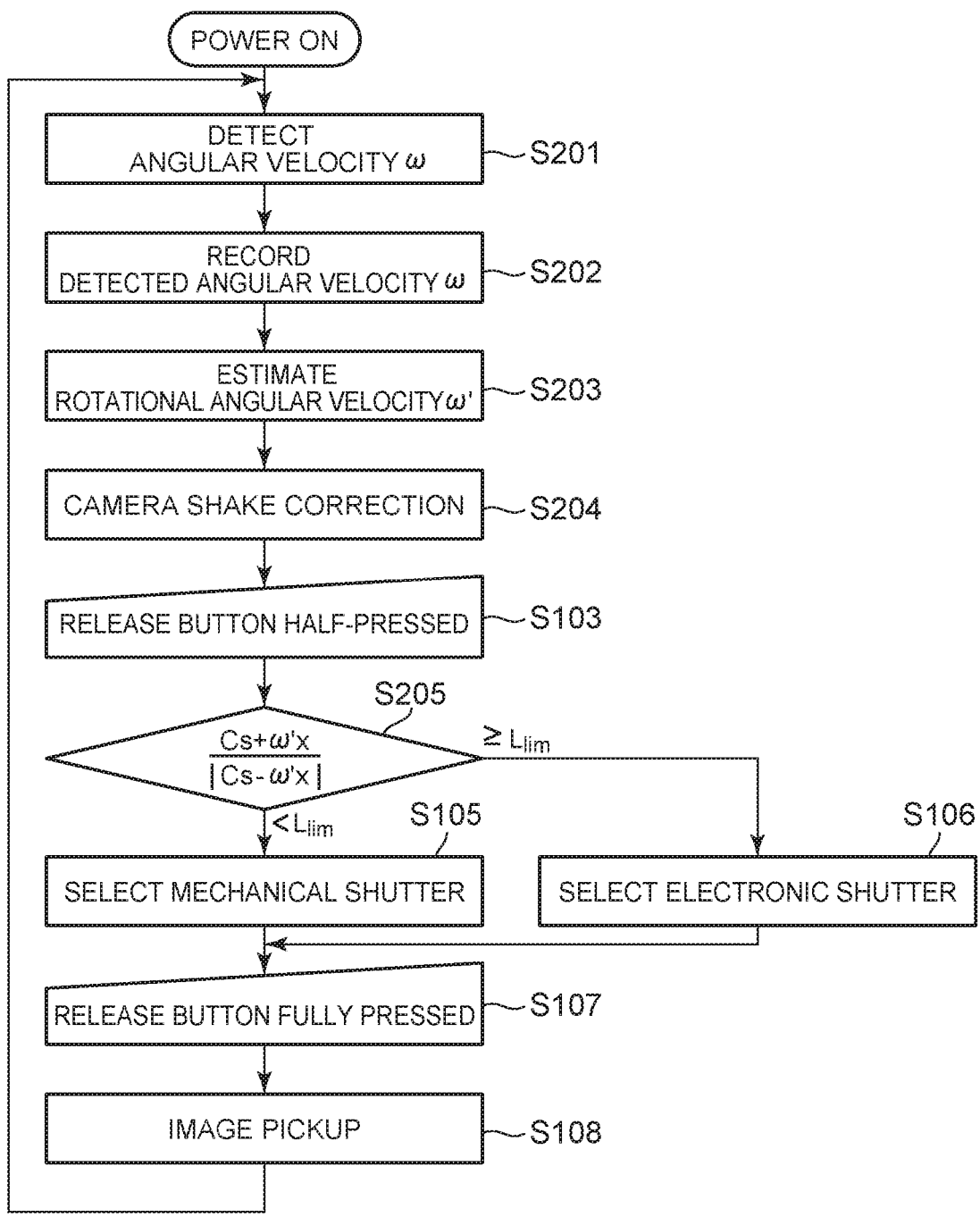
FIG. 6 is a diagram illustrating a flowchart for describing an operation of the image pickup apparatus according to the second embodiment.

The following describes the operation of the image pickup apparatus 1 of this embodiment with reference to FIG. 6.

When the power supply of the image pickup apparatus 1 is turned on, the camera control unit 40 can implement the functions of the angular velocity estimation unit 403 and the camera shake reducing control unit 401 according to the control program recorded in the control information memory 41. Specifically, the angular velocity estimation unit 403 of the camera control unit 40 can fetch the rotational angular velocity in the roll direction of the image pickup apparatus 1 detected by the angular velocity detection sensor 38, in other words, the rotational angular velocity ω of the optical system 21 with the optical axis direction of the optical system 21 as a rotation axis (step S201) and can record the rotational angular velocity ω into the control information memory 41 or a temporary memory not illustrated (step S202). Thereafter, the rotational angular velocity ω' in exposure can be estimated on the basis of the rotational angular velocity ω stored in the control information memory 41 or in the temporary memory not illustrated since the power supply is turned on (step S203). The camera shake reducing control unit 401 of the camera control unit 40 can control the image sensor driving actuator 34 so as to move the image sensor 33 in a direction of reducing the camera shake in the rotation direction on the basis of the estimated rotational angular velocity ω' in exposure (step S204). The functions of the angular velocity estimation unit 403 and the camera shake reducing control unit 401 can continue to be performed until the power supply is turned off. In addition, naturally the camera shake reduction may be performed not only in the rotation direction, but also in the right and left direction, the up and down direction, the yaw direction, and the pitch direction of the image pickup plane 331 of the image sensor 33.

Furthermore, when the release button of the input device 39 is half-pressed (step S103), the camera control unit 40 can perform the function of the shutter selection unit 402 according to the control program recorded in the control information memory 41. Specifically, the shutter selection unit 402 of the camera control unit 40 can calculate the left side of the expression (10) by using the estimated rotational angular velocity ω' in exposure and can discriminate whether the expression (10) is satisfied (step S205). Unless the expression (10) is satisfied, the mechanical shutter 31 can be selected as a shutter to be used (step S105). Whereas, if the expression (10) is satisfied, the electronic shutter of the image sensor 33 can be selected as a shutter to be used (step S106).

Then, when the release button of the operation part 39 is fully pressed (step S107), the camera control unit 40 can perform an imaging operation by using the selected shutter (step S108). Specifically, if the mechanical shutter 31 is selected, the camera control unit 40 can control the shutter driving actuator 32 to perform the imaging operation by using the mechanical shutter 31. Moreover, if the electronic shutter is selected, the camera control unit 40 can control the image sensor 33 to perform the imaging operation by using the electronic shutter.

Thereafter, the processing can return to step S201.

As described hereinabove, the image pickup apparatus 1 according to the second embodiment can include the image sensor 33 provided with the image pickup plane 331 for photoelectrically converting a subject image, the image sensor driving actuator 34 which is configured to rotatably move the image sensor 33 relative to a predetermined rotation axis passing through the center of the image pickup plane 331, the angular velocity detection sensor 38 which is configured to detect the rotational angular velocity of the image pickup apparatus 1 about the predetermined rotation axis, the angular velocity estimation unit 403 configured to obtain an estimated rotational angular velocity by estimating the rotational angular velocity of the image pickup apparatus 1 in exposure, the camera shake reducing control unit 401 which is configured to control the image sensor driving actuator 34 to reduce rotational shake which occurs along with an attitude change around the predetermined rotation axis of the image pickup apparatus 1 on the basis of the estimated rotational angular velocity, the mechanical shutter 31 which is a first shutter of a mechanical type configured to control the exposure time of the image sensor 33, the electronic shutter of the image sensor 33 which is a second shutter of an electronic type configured to control the exposure time of the image sensor 33, and the shutter selection unit 402 configured to select either one of the mechanical shutter 31 and the electronic shutter of the image sensor 33 according to the estimated rotational angular velocity. Specifically, the shutter to be used is able to be switched according to the estimated rotational angular velocity, thereby enabling the provision of an image pickup apparatus capable of preventing unevenness in exposure amount even if a large rotational camera shake has occurred during exposure.

Furthermore, the shutter selection unit 402 can be configured to select the electronic shutter if the estimated rotational angular velocity ω' satisfies the following conditional expression:

$$(C_s+\omega'x)/(|C_s-\omega'x|) \geq L_{lim}$$

where $C_s$ is the curtain speed of the mechanical shutter 31, ω' is the estimated rotational angular velocity, x is a distance from the center of the image pickup plane 331 to the long-side end of the image pickup plane 331, and $L_{lim}$ is a predetermined threshold value. Specifically, if the estimated rotational angular velocity ω' is within a speed range in which unevenness in exposure amount is likely to occur, the occurrence of unevenness in exposure amount is able to be prevented by switching from the mechanical shutter 31 to the electronic shutter.

In addition, the angular velocity estimation unit 403 is configured to estimate the rotational angular velocity ω' of the image pickup apparatus 1 in exposure on the basis of the rotational angular velocity detected by the angular velocity detection sensor 38 before the exposure. Specifically, the angular velocity estimation unit 403 can estimate the estimated rotational angular velocity ω' with power supply as a trigger and can perform the camera shake reduction and the shutter selection on the basis of the estimated rotational angular velocity ω'. Furthermore, in this case, the image pickup apparatus 1 can further include a control information memory 41 as a storage part which stores the rotational angular velocity detected by the angular velocity detection sensor 38 and the angular velocity estimation unit 403 is configured to estimate the rotational angular velocity ω' of the image pickup apparatus 1 in exposure on the basis of the rotational angular velocity stored in the control information memory 41. Therefore, the image pickup apparatus 1 is able to detect a number of rotational angular velocities for use in estimation, thereby enabling estimation of the rotational angular velocity ω' of the image pickup apparatus 1 in exposure also in consideration of shake caused by factors other than the operator's camera shake such as, for example, imaging on a ship or the like. Moreover, the rotational angular velocity ω' of the image pickup apparatus 1 in exposure is able to be estimated in consideration of operator's habits and tendencies of camera shake or the like by accumulating a number of detected rotational angular velocities ω.

In addition, although the present invention has been described by giving an example that the operation is performed with the estimation of the rotational angular velocity ω' and the camera shake reduction triggered by power supply and with the shutter selection triggered by half-pressing of the release button, the present invention is not limited thereto. Furthermore, the present invention does not presuppose the two-step release button.

Third Embodiment

A third embodiment will be described below. Although an image pickup apparatus 1 according to this embodiment is able to reduce camera shake by using an estimated rotational angular velocity ω' similarly to the second embodiment, the accumulation period of a rotational angular velocity ω for use in the estimation can differ from that of the second embodiment. Therefore, the configuration example of the third embodiment is the same as that of the second embodiment and the description thereof will be omitted. Moreover, a part of the operation of the third embodiment is the same as that of the second embodiment and the same reference numerals are used for the same elements as in the second embodiment and the description thereof is omitted here.

Also in this embodiment, all of the camera shake reducing control unit 401, the shutter selection unit 402, and the angular velocity estimation unit 403 may be configured as dedicated hardware elements provided separately from the camera control unit 40 or may be composed of one or more processors comprising hardware, such as a CPU or an ASIC, different from that of the camera control unit 40 to serve as the camera shake reducing control unit 401, the shutter selection unit 402, and the angular velocity estimation unit 403, by using the control program or control parameters recorded in a control information memory 41.

Figure 7:
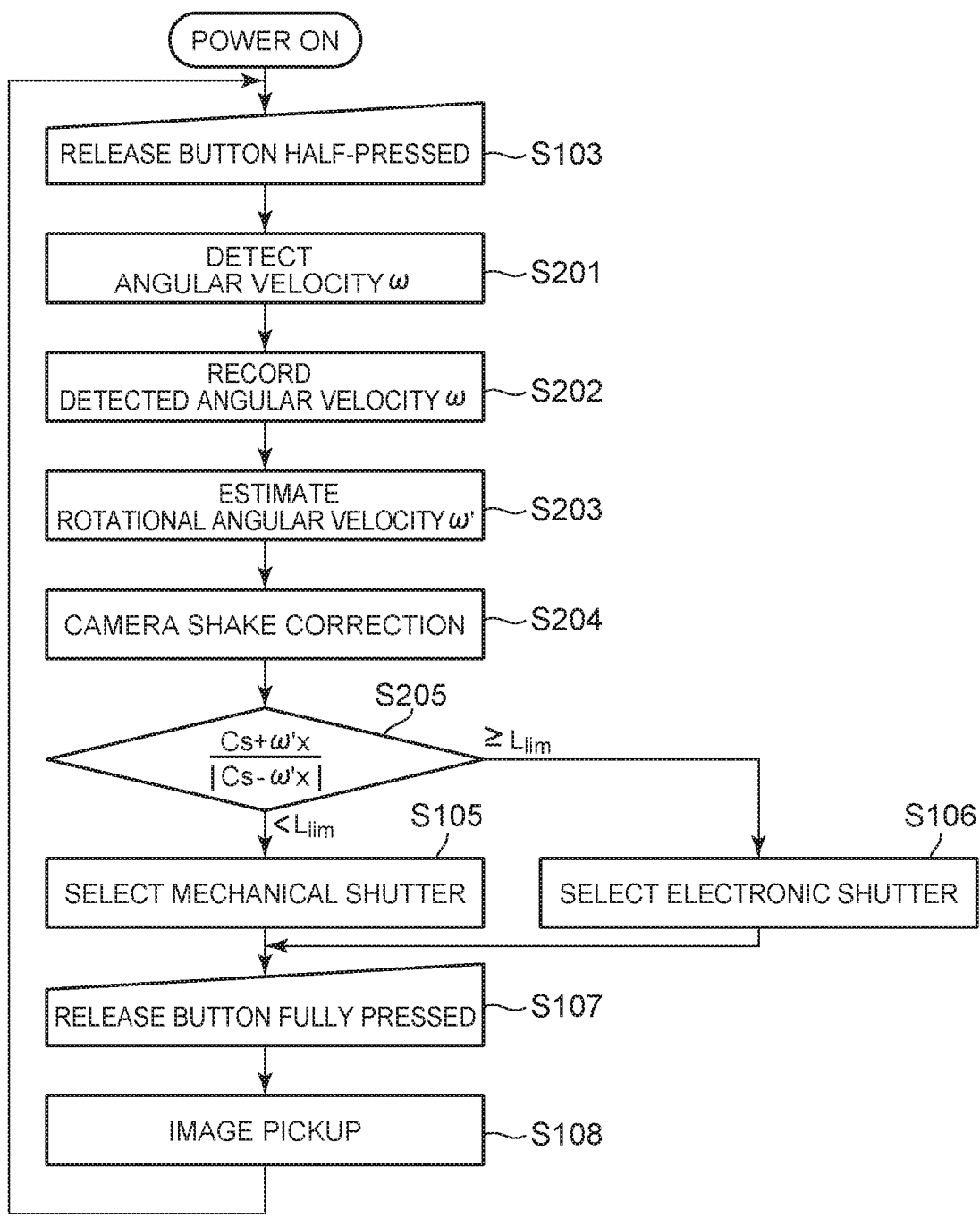
FIG. 7 is a diagram illustrating a flowchart for describing an operation of an image pickup apparatus according to a third embodiment of the present invention.

Referring to FIG. 7, the operation of the image pickup apparatus 1 of this embodiment will be described below.

After the power supply of the image pickup apparatus 1 is turned on, the camera control unit 40 can await the half-pressing of the release button of the input device 39. Then, upon the half-pressing of the release button (step S103), the camera control unit 40 can perform the functions of the angular velocity estimation unit 403 and the camera shake reducing control unit 401 according to the control program recorded in the control information memory 41. Specifically, the angular velocity estimation unit 403 of the camera control unit 40 can fetch the rotational angular velocity in the roll direction of the image pickup apparatus 1 detected by the angular velocity detection sensor 38, in other words, the rotational angular velocity ω of the optical system 21 with the optical axis direction of the optical system 21 as the rotation axis (step S201) and records the rotational angular velocity ω into the control information memory 41 or a temporary memory not illustrated (step S202). Thereafter, the rotational angular velocity ω' in exposure can be estimated on the basis of the rotational angular velocities ω accumulated in the control information memory 41 or in the temporary memory not illustrated since the release button has been half-pressed (step S203). The camera shake reducing control unit 401 of the camera control unit 40 can control the image sensor driving actuator 34 so as to move the image sensor 33 in a direction of reducing the camera shake in the rotation direction on the basis of the estimated rotational angular velocity ω' in exposure (step S204). The functions of the angular velocity estimation unit 403 and the camera shake reducing control unit 401 can continue to be performed until the depression (half-pressing or full-pressing) of the release button is released. Naturally, the camera shake reduction may be performed not only in the rotation direction, but also in the right and left direction, the up and down direction, the yaw direction, and the pitch direction of the image pickup plane 331 of the image sensor 33.

When the release button of the input device 39 is half-pressed (step S103), the camera control unit 40 can perform the function of the shutter selection unit 402 according to the control program recorded in the control information memory 41. Specifically, the shutter selection unit 402 of the camera control unit 40 can calculate the left side of the expression (10) by using the estimated rotational angular velocity ω' in exposure and can discriminate whether the expression (10) is satisfied (step S205). Unless the expression (10) is satisfied, the mechanical shutter 31 can be selected as a shutter to be used (step S105). Whereas, if the expression (10) is satisfied, the electronic shutter of the image sensor 33 can be selected as a shutter to be used (step S106).

Furthermore, when the release button of the operation unit 39 is fully pressed (step S107), the camera control unit 40 can perform an imaging operation by using the selected shutter (step S108). Specifically, if the mechanical shutter 31 is selected, the camera control unit 40 can control the shutter driving actuator 32 to perform the imaging operation by using the mechanical shutter 31. Moreover, if the electronic shutter is selected, the camera control unit 40 can control the image sensor 33 to perform the imaging operation by using the electronic shutter.

Thereafter, the processing can return to step S103.

In the third embodiment, the image pickup apparatus 1 further can include the input device 39 operated by the operator and the angular velocity estimation unit 403 is configured to estimate the rotational angular velocity ω' of the image pickup apparatus 1 in exposure on the basis of the rotational angular velocity detected by the angular velocity detection sensor 38 according to the operation of the input device 39. Specifically, the estimated rotational angular velocity ω' can be estimated with the half-pressing of the release button of the input device 39 as a trigger to perform the camera shake reduction and the shutter selection on the basis of the estimated rotational angular velocity ω'. Moreover, in this case, the image pickup apparatus 1 can further include a control information memory 41 as a storage part which stores the rotational angular velocity detected by the angular velocity detection part 38, and the angular velocity estimation unit 403 is configured to estimate the rotational angular velocity ω' of the image pickup apparatus 1 in exposure on the basis of the rotational angular velocity stored in the control information memory 41. Therefore, the accumulation of the detected rotational angular velocities ω achieved close to a time when exposure is performed can enable the estimation of the rotational angular velocities ω' close to the movements in actual exposure.

Although the present invention has been described by giving an example that the operation is performed with the estimation of the rotational angular velocity ω', the camera shake reduction, and the shutter selection triggered by the half-pressing of the release button, the present invention is not limited thereto. For example, an operator's operation other than the half-pressing of the release button may be used as a trigger. In other words, the present invention may be configured so that the operator may select the operation. Furthermore, the present invention does not presuppose the two-step release button.

Note that the present invention is not directly limited to the above embodiments, and constituent elements can be modified and embodied in the stage of practice without departing from the spirit and scope of the invention. Various inventions can be formed by properly combining a plurality of constituent elements disclosed in the above embodiments. For example, several constituent elements may be omitted from all the constituent elements described in the embodiments. In addition, constituent elements throughout different embodiments may be properly combined. Naturally, various modifications or applications to the present invention may be made within the spirit and scope of the present invention in this manner.

In addition, all of the processes performed by the image pickup apparatus 1 in the above embodiments may be stored as executable programs. As for these programs, the above processes can be performed by reading the programs stored in a memory card (ROM card, RAM card, or the like), a magnetic disk (Floppy® disk, hard disk, or the like), an optical disk (CD-ROM, DVD, or the like), or a storage medium of an external storage device such as a semiconductor memory and controlling the operations by the read programs.

What is claimed is:
1. An image pickup apparatus comprising:
an image sensor comprising an image pickup plane, wherein the image sensor is configured to photoelectrically convert a subject image formed on the image pickup plane to an image signal;
a driving actuator configured to rotatably move the image sensor relative to a rotation axis passing through the image pickup plane, wherein the rotation axis coincides with an optical axis of an optical system configured to form the subject image on the image pickup plane;
an angular velocity detection sensor configured to detect a rotational angular velocity of the image sensor about the rotation axis;
a first shutter of a mechanical type, wherein the first shutter is configured to control an exposure time of the image sensor;
a second shutter of an electronic type, wherein the second shutter is configured to control the exposure time of the image sensor; and
one or more processors comprising hardware, wherein the one or more processors are configured to:
control the driving actuator to reduce rotational shake around the rotation axis based on the rotational angular velocity; and
select one of the first shutter and the second shutter to control the exposure time of the image sensor based on the rotational angular velocity.
2. The image pickup apparatus according to claim 1, wherein the one or more processors are configured to determine whether the rotational angular velocity satisfies a conditional expression or not,
wherein the conditional expression is $(C_s+\omega x)/(|C_s-\omega x|) \geq L_{lim}$,
wherein $C_s$ is a curtain speed of the first shutter, ω is the rotational angular velocity, x is a distance from the center of the image pickup plane to a long-side end of the image pickup plane, and $L_{lim}$ is a threshold value, and
wherein the one or more processors are configured to select the second shutter in response to determining that the rotational angular velocity ω satisfies the conditional expression.
3. The image pickup apparatus according to claim 1, further comprising:
a gravity direction detection sensor configured to detect a gravity direction, wherein the driving actuator is configured to rotatably move the image sensor so that one side of the image sensor is parallel to the gravity direction.

4. An image pickup apparatus comprising:
an image sensor comprising an image pickup plane, wherein the image sensor is configured to photoelectrically convert a subject image formed on the image pickup plane to an image signal;
a driving actuator configured to rotatably move the image sensor relative to a rotation axis passing through the image pickup plane, wherein the rotation axis coincides with an optical axis of an optical system configured to form the subject image on the image pickup plane;
a first shutter of a mechanical type configured to control an exposure time of the image sensor;
a second shutter of an electronic type configured to control the exposure time of the image sensor; and
one or more processors comprising hardware, wherein the one or more processors are configured to:
estimate an estimated rotational angular velocity of the image sensor during at least a part of the exposure time;
control the driving actuator to reduce rotational shake around the rotation axis based on the estimated rotational angular velocity; and
select one of the first shutter and the second shutter based on the estimated rotational angular velocity.

5. The image pickup apparatus according to claim 4,
wherein the one or more processors are configured to determine whether the estimated rotational angular velocity satisfies a conditional expression or not,
wherein the conditional expression is $(C_s+\omega'x)/(|C_s-\omega'x|) \geq L_{lim}$,
wherein $C_s$ is a curtain speed of the first shutter, $\omega'$ is the estimated rotational angular velocity, x is a distance from the center of the image pickup plane to a long-side end of the image pickup plane, and $L_{lim}$ is a threshold value, and
wherein the one or more processors are configured to select the second shutter in response to determining that the estimated rotational angular velocity $\omega'$ satisfies the conditional expression.

6. The image pickup apparatus according to claim 5, further comprising:
an angular velocity detection sensor configured to detect a rotational angular velocity of the image sensor about the rotation axis,
wherein the one or more processors are configured to estimate the estimated rotational angular velocity of the image sensor during at least a part of the exposure time based on the rotational angular velocity detected by the angular velocity detection sensor.

7. The image pickup apparatus according to claim 5, further comprising:
an input device configured to input an instruction of an operator; and
an angular velocity detection sensor configured to detect a rotational velocity of the image sensor about the rotation axis,
wherein in response to the instruction input by the input device, the one or more processors are configured to estimate the estimated rotational angular velocity of the image sensor during at least a part of the exposure time based on the rotational angular velocity detected by the angular velocity detection sensor.

8. The image pickup apparatus according to claim 5, further comprising:
an angular velocity detection sensor configured to detect a rotational angular velocity of the image sensor about the rotation axis; and
a storage configured to store the rotational angular velocity detected by the angular velocity detection sensor,
wherein the one or more processors are configured to estimate the estimated rotational angular velocity of the image sensor during at least a part of the exposure time based on the rotational angular velocity stored in the storage.

9. The image pickup apparatus according to claim 4, further comprising:
an angular velocity detection sensor configured to detect a rotational angular velocity of the image sensor about the rotation axis,
wherein the one or more processors are configured to estimate the estimated rotational angular velocity of the image sensor during at least a part of the exposure time based on the rotational angular velocity detected by the angular velocity detection sensor.

10. The image pickup apparatus according to claim 4, further comprising:
an input device configured to input an instruction of an operator; and
an angular velocity detection sensor configured to detect a rotational velocity of the image sensor about the rotation axis,
wherein in response to the instruction input by the input device, the one or more processors are configured to estimate the estimated rotational angular velocity of the image sensor during at least a part of the exposure time based on the rotational angular velocity detected by the angular velocity detection sensor.

11. The image pickup apparatus according to claim 4, further comprising:
an angular velocity detection sensor configured to detect a rotational angular velocity of the image sensor about the rotation axis; and
a storage configured to store the rotational angular velocity detected by the angular velocity detection sensor,
wherein the one or more processors are configured to estimate the estimated rotational angular velocity of the image sensor during at least a part of the exposure time based on the rotational angular velocity stored in the storage.

12. A non-transitory computer-readable storage device storing instructions for controlling an image pickup apparatus,
wherein the image pickup apparatus comprises:
an image sensor comprising an image pickup plane, wherein the image sensor is configured to photoelectrically convert a subject image formed on the image pickup plane to an image signal;
a driving actuator configured to rotatably move the image sensor relative to a rotation axis passing through the image pickup plane, wherein the rotation axis coincides with an optical axis of an optical system configured to form the subject image on the image pickup plane;
an angular velocity detection sensor configured to detect a rotational angular velocity of the image sensor about the rotation axis;
a first shutter of a mechanical type, wherein the first shutter is configured to control an exposure time of the image sensor; and a second shutter of an electronic type, wherein the second shutter is configured to control the exposure time of the image sensor, and wherein the instructions, when executed by one or more processors, cause the one or more processors to:
control the driving actuator to reduce rotational shake around the rotation axis based on the rotational angular velocity; and
select one of the first shutter and the second shutter to control the exposure time of the image sensor based on the rotational angular velocity.

13. The non-transitory computer-readable storage device according to claim 12,
wherein the instructions, when executed by the one or more processors, cause the one or more processors to determine whether the rotational angular velocity satisfies a conditional expression or not,
wherein the conditional expression is $(C_s+\omega x)/(|Cs-\omega x|) \geq L_{lim}$,
wherein $C_s$ is a curtain speed of the first shutter, $\omega$ is the rotational angular velocity, x is a distance from the center of the image pickup plane to a long-side end of the image pickup plane, and $L_{lim}$ is a threshold value, and
wherein the instructions, when executed by the one or more processors, cause the one or more processors to select the second shutter in response to determining that the rotational angular velocity $\omega$ satisfies the conditional expression.

14. The non-transitory computer-readable storage device according to claim 12,
wherein the image pickup apparatus further comprises:
a gravity direction detection sensor configured to detect a gravity direction,
wherein the instructions, when executed by the one or more processors, cause the one or more processors to control the driving actuator to rotatably move the image sensor so that one side of the image sensor is parallel to the gravity direction.

15. A non-transitory computer-readable storage device storing instructions for controlling an image pickup apparatus,
wherein the image pickup apparatus comprises:
an image sensor comprising an image pickup plane, wherein the image sensor is configured to photoelectrically convert a subject image formed on the image pickup plane to an image signal;
a driving actuator configured to rotatably move the image sensor relative to a rotation axis passing through the image pickup plane, wherein the rotation axis coincides with an optical axis of an optical system configured to form the subject image on the image pickup plane;
a first shutter of a mechanical type configured to control an exposure time of the image sensor; and
a second shutter of an electronic type configured to control the exposure time of the image sensor, and
wherein the instructions, when executed by one or more processors, cause the one or more processors to:
estimate an estimated rotational angular velocity of the image sensor during at least a part of the exposure time;
control the driving actuator to reduce rotational shake around the rotation axis based on the estimated rotational angular velocity; and
select one of the first shutter and the second shutter based on the estimated rotational angular velocity.

16. The non-transitory computer-readable storage device according to claim 15,
wherein the instructions, when executed by the one or more processors, cause the one or more processors to determine whether the estimated rotational angular velocity satisfies a conditional expression or not,
wherein the conditional expression is $(C_s+\omega' x)/(|Cs-\omega' x|) \geq L_{lim}$,
wherein $C_s$ is a curtain speed of the first shutter, $\omega'$ is the estimated rotational angular velocity, x is a distance from the center of the image pickup plane to a long-side end of the image pickup plane, and $L_{lim}$ is a threshold value, and
wherein the instructions, when executed by the one or more processors, cause the one or more processors to select the second shutter in response to determining that the estimated rotational angular velocity $\omega'$ satisfies the conditional expression.

17. The non-transitory computer-readable storage device according to claim 16,
wherein the image pickup apparatus further comprises:
an angular velocity detection sensor configured to detect a rotational angular velocity of the image sensor about the rotation axis, and
wherein the instructions, when executed by the one or more processors, cause the one or more processors to estimate the estimated rotational angular velocity of the image sensor during at least a part of the exposure time based on the rotational angular velocity detected by the angular velocity detection sensor.

18. The non-transitory computer-readable storage device according to claim 16,
wherein the image pickup apparatus further comprises:
an angular velocity detection sensor configured to detect a rotational angular velocity of the image sensor about the rotation axis; and
a storage configured to store the rotational angular velocity detected by the angular velocity detection sensor, and
wherein the instructions, when executed by the one or more processors, cause the one or more processors to estimate the estimated rotational angular velocity of the image sensor during at least a part of the exposure time based on the rotational angular velocity stored in the storage.

19. The non-transitory computer-readable storage device according to claim 15, further comprising:
wherein the image pickup apparatus further comprises:
an angular velocity detection sensor configured to detect a rotational angular velocity of the image sensor about the rotation axis, and
wherein the instructions, when executed by the one or more processors, cause the one or more processors to estimate the estimated rotational angular velocity of the image sensor during at least a part of the exposure time based on the rotational angular velocity detected by the angular velocity detection sensor.

20. The non-transitory computer-readable storage device according to claim 15,
wherein the image pickup apparatus further comprises:
an input device configured to input an instruction of an operator; and
an angular velocity detection sensor configured to detect a rotational velocity of the image sensor about the rotation axis,
wherein the instructions, when executed by the one or more processors, cause the one or more processors to estimate, in response to the instruction input by the input device, the estimated rotational angular velocity of the image sensor during at least a part of the exposure time based on the rotational angular velocity detected by the angular velocity detection sensor.

21. The non-transitory computer-readable storage device according to claim 16,
wherein the image pickup apparatus further comprises:
an input device configured to input an instruction of an operator; and
an angular velocity detection sensor configured to detect a rotational velocity of the image sensor about the rotation axis, and
wherein the instructions, when executed by the one or more processors, cause the one or more processors to estimate, in response to the instruction input by the input device, the estimated rotational angular velocity of the image sensor during at least a part of the exposure time based on the rotational angular velocity detected by the angular velocity detection sensor.

22. The non-transitory computer-readable storage device according to claim 15,
wherein the image pickup apparatus further comprises:
an angular velocity detection sensor configured to detect a rotational angular velocity of the image sensor about the rotation axis; and
a storage configured to store the rotational angular velocity detected by the angular velocity detection sensor, and
wherein the instructions, when executed by the one or more processors, cause the one or more processors to estimate the estimated rotational angular velocity of the image sensor during at least a part of the exposure time based on the rotational angular velocity stored in the storage.

\* \* \* \* \*